United States Patent [19]
Louault et al.

[11] 3,959,959
[45] June 1, 1976

[54] MACHINE FOR VINTAGING GRAPES

[75] Inventors: Guy Louault, Lavau; Gerard Louault, St. Fargue, both of France

[73] Assignee: S. A. Louault, Saint Fargeau, France

[22] Filed: Nov. 7, 1974

[21] Appl. No.: 521,613

[30] Foreign Application Priority Data
Nov. 7, 1973    France .................................. 73.39515

[52] U.S. Cl. ........................................... 56/330
[51] Int. Cl.² ..................................... A01D 46/00
[58] Field of Search ........................... 56/330, 328 R

[56] References Cited
UNITED STATES PATENTS

| | | | |
|---|---|---|---|
| 3,184,908 | 5/1965 | Rust | 56/330 |
| 3,385,042 | 5/1968 | Christie et al. | 56/330 |
| 3,494,117 | 2/1970 | Weygandt et al. | 56/330 |
| 3,760,574 | 9/1973 | Tassone | 56/330 |

Primary Examiner—Louis G. Mancene
Assistant Examiner—J. N. Eskovitz
Attorney, Agent, or Firm—Alan H. Levine

[57] ABSTRACT

A machine for vintaging grapes. The machine comprises a framework, preferably U-shaped, which overlaps a row of vines and travels along the vine row by means, for example, of wheels. The machine incorporates at least two pairs of cylinders positioned with their longitudinal axes vertical and each having a plurality of radially extending rods, which may penetrate the vines. Means are provided for imparting a vibratory motion to the cylinders as the machine travels, so that the rods on the cylinders may harvest the crop which is then removed by means of a conveyor belt on the machine.

17 Claims, 5 Drawing Figures

MACHINE FOR VINTAGING GRAPES

The present invention relates to a machine intended for vintaging grapes, comprising gathering cylinders spiked with horizontal rods extending radially from the outside of each cylinder and subject to a vibratory movement. During the movement of the machine, in the overlapping position, along the rows of vine plants, the vibratory movement imparted to the rods acts in such a manner that said rods engaging with the vine shoots, detach the grapes from the vine.

In view of the constant rise in the cost of labor, it is becoming more and more advantageous to have machines facilitating entirely mechanical vintaging of the grapes.

To produce a mechanical vintaging machine which is entirely satisfactory in practice, it is necessary to fulfil the two following requirements simultaneously:

it is necessary to gather and vintage virtually all the grapes borne by the branches of the vine plants and it is necessary to reduce the damage to the grapes and plants at the time of vintaging, as much as possible.

Hitherto, none of the machines already proposed have made it possible to undertake very complete vintaging without necessarily incurring considerable damage both to the vine plants and to the grapes themselves, so much so that these machines have never been used for vintaging grapes in a quality vineyard.

A serious drawback relating to known machines, in particular those of the type comprising shaker panels, is that the gathering members exert considerable impact on the vine and considerably damage the plant as well as the grapes gathered.

Another serious drawback of these known machines is that during their operation, the gathering members (for example shaker panels) are in sliding contact with the vine shoots which they compress considerably. This clearly causes longitudinal abrasion of the vines and thus damages the grapes collected as well as the vine plants themselves.

The object of the invention is to provide a machine for vintaging grapes, making it possible to satisfy the two aforementioned requirements simultaneously.

The machine according to the invention comprises, in manner known per se, a frame of straight cross-section, substantially in the shape of an inverted U, mounted on wheels and able to move along the rows of vine plants, always overlapping one of said rows. According to an essential feature of the invention, the machine comprises at least two pairs of gathering cylinders, preferably two pairs, one at the front the other at the rear, the cylinders of one pair being disposed on either side of the central longitudinal axis of the machine; each cylinder is equipped with a plurality of horizontal rods having a certain elasticity and extending radially towards the outside of the cylinder. Each cylinder is mounted to rotate freely with respect to its vertical axis and is mounted on two support arms themselves pivotally mounted on the frame of the machine in order to be able to move in a substantially transverse direction, the two pivot points of the upper and lower support arms being in alignment. Finally, each cylinder is subject to a vibratory movement about the pivot point of the support arms.

According to another feature of the invention, each of the cylinders comprises a plurality of vertical rows of densely distributed rods, which are each enclosed between two vertical rows of rods having an open distribution.

According to a particularly advantageous embodiment of the invention, if one of the cylinders comprises vertical rows of rods according to a first open distribution, the two other directly adjacent cylinders, namely the second cylinder completing the front or rear pair and the other cylinder located either in front or behind it, is provided with open vertical rows having a second open distribution in which the rods are offset with respect to those of the first open distribution.

According to another feature of the invention, the vibratory movement of each cylinder is ensured by a device comprising two masses mounted eccentrically on said cylinder. Synchronous rotary speeds are imparted to the two masses, which are preferably outside each cylinder, in order to create an imbalance giving rise to the vibratory movement of said cylinder about the pivot point of the support arms.

The invention will be described hereafter in more detail with reference to the accompanying drawings, given as a non-limiting example and illustrating a preferred embodiment of the invention and in which.

Generally, the machine according to the invention comprises a frame of straight cross-section, substantially in the shape of an inverted U allowing said machine, mounted on wheels and provided with a propulsion device, to move along the rows of vine plants in an overlapping position.

The machine also comprises, in manner known per se, two conveyor belts integral with its frame, arranged longitudinally and symmetrically with respect to the central axis of the machine, these belts being intended to convey the gathered grapes upwards to a storage container. Advantageously, this container is arranged at the center of the machine in order to increase the stability thereof. Furthermore, the machine according to the invention also comprises, in manner known per se, two elongated deformable guide members, located in the central part of the machine and having a certain incline in order to direct the grapes gathered onto the conveyor belts. Naturally, these guide members are retractable in order to be able to withdraw in front of the vine props and vine plants during the passage of the machine in the overlapped position along a row of vine plants. It is also indispensable to provide the present machine with a blower unit directing a continuous flow of air onto the conveyor belts in order to eliminate most of the foreign matter, such as leaves and ends of shoots accompanying the gathered grapes.

Figure 1:
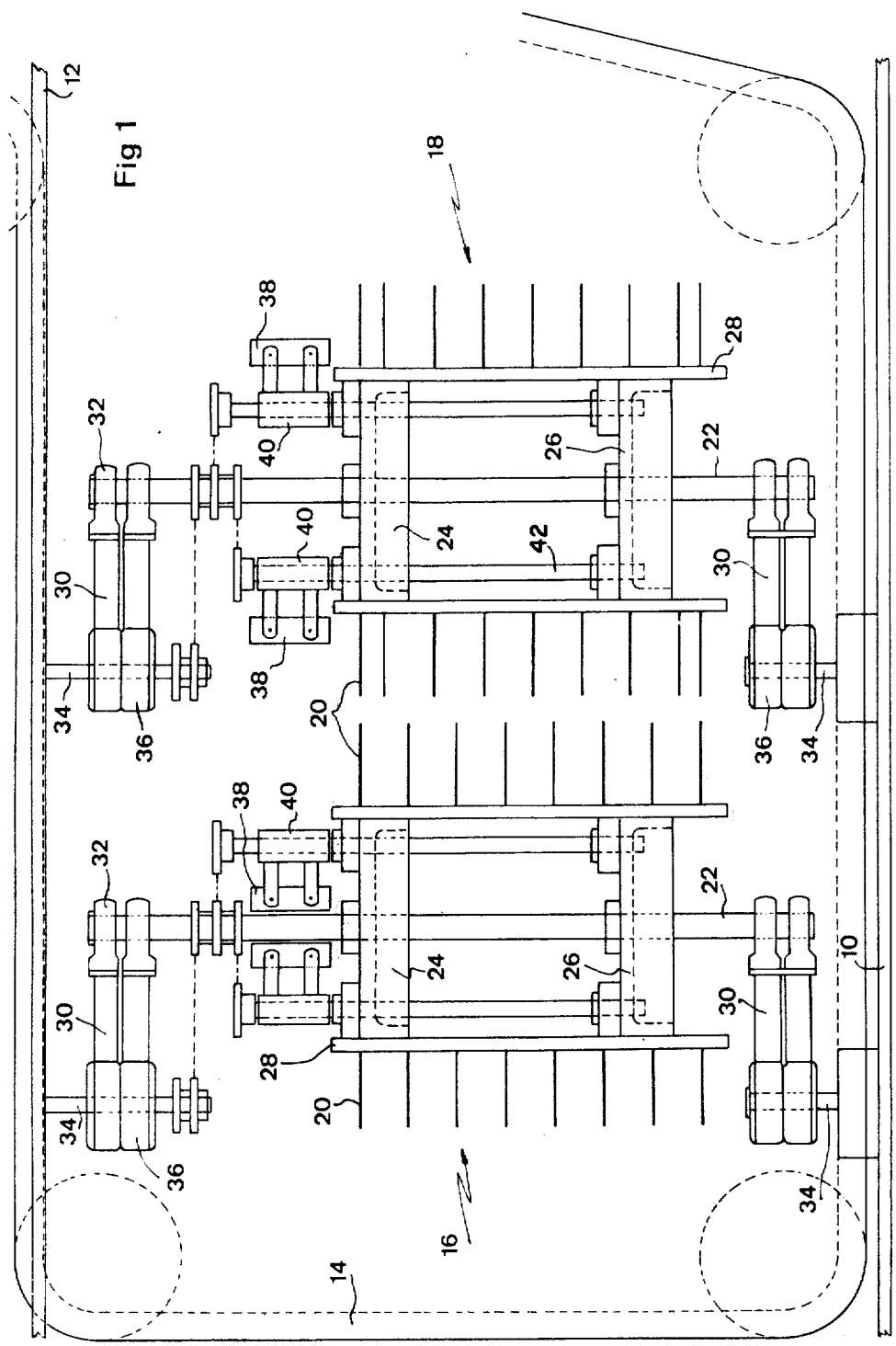
FIG. 1 is a partial sectional side view of the machine according to the invention comprising two pairs of gathering cylinders.

FIG. 1 shows only one part of the machine frame, namely a lower member 10 as well as an upper member 12. The chassis proper of the machine (not shown in FIG. 1) is integral with the upper member 12. Mounted on this chassis are the driving and control station, the container for storing the vintaged grapes, the blower unit and all the other control members, for example the member making it possible to regulate the inclination of the working plane of the gathering cylinders. FIG. 1 also shows, in part, one of the two conveyor belts 14 intended for conveying the vintaged grapes to the storage container.

Figure 2:
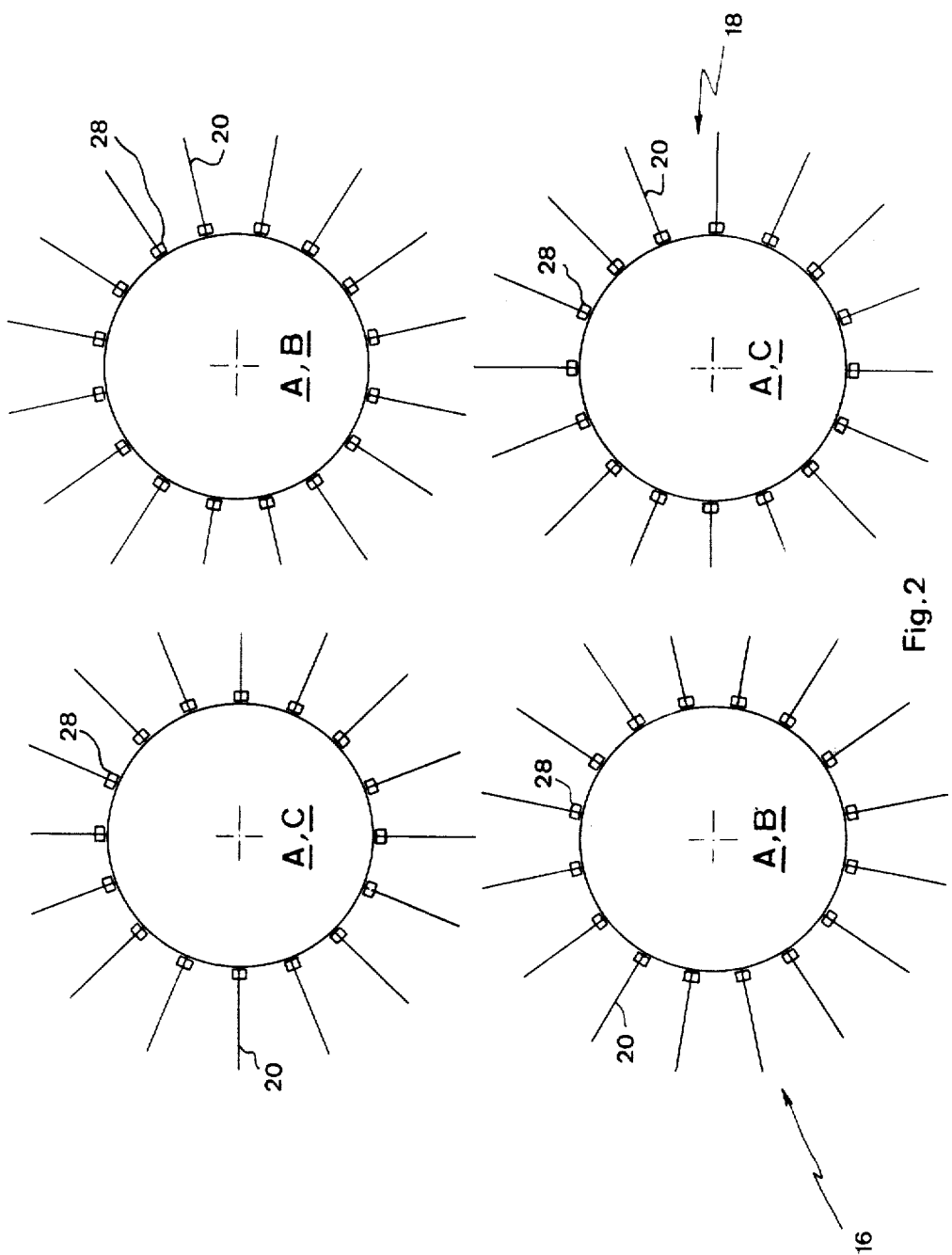
FIG. 2 is a diagrammatic plan view of the two pairs of gathering cylinders according to the invention.

FIG. 1 shows two gathering cylinders 16 and 18 belonging respectively to the front and rear pair. These two cylinders 16 and 18 are completely identical with the exception of the type of distribution of the rods 20 which cover the lateral surface of each cylinder. Each cylinder 16, 18 is mounted to rotate freely on its shaft 22. Consequently, during the forwards movement of the machine in the position overlapping one row of vine plants, the rods 20 engage with the vine shoots and penetrate the depth of the vine. Consequently, the various gathering cylinders rotate about their shaft 22. In the embodiment of FIG. 1, the machine comprises two pairs of gathering cylinders, one at the front the other at the rear, the cylinders of one pair being arranged on either side of the longitudinal central axis of the machine. Each cylinder is provided with a plurality of horizontal rods 20 having a certain resilience and extending radially towards the outside of the cylinder. The rods 20 may be made from a high class steel for example (XC 65). Each cylinder proper comprises an upper ring 24 and a lower ring 26 mounted to rotate freely on the shaft 22. The peripheries of the rings are equipped with a plurality of vertical supports 28 for the rods 20. It will thus be understood that the rods 20 of each cylinder are grouped along the generatrices of the cylinder in the form of a vertical row corresponding to the supports 28. These supports 28 may be made for example in the form of bars in which the rods 20 are inserted. FIGS. 1 to 3 show that the major part of the rods 20 belonging to one vertical row are equally spaced.

Each cylinder is arranged on two upper and lower support arms 30, the connection between the arms 30 and shaft 22 of each cylinder is by way of support bearings 32. The other end of each arm 30 is made integral with a shaft 34 fixed to the longitudinal member of the frame by means of support bearings 36. The arms 30 are thus pivotally mounted on the machine frame in order to be able to move in a substantially transverse direction, the two upper and lower pivot shafts 34 of the support arms 30 naturally being in alignment. The arms 30 are each subject to an elastic retaining force tending to restore them towards the central axis of the machine such that there is an interpenetration of the rods 20 belonging to the two cylinders of one front or rear pair. The maximum interpenetration depth of the rods 20 is generally regulated by the presence of an abutment (not shown) integral with the machine frame and co-operating with each corresponding arm 30. This abutment, whose position is possibly adjustable, limits the travel of the support arms 30. Various tests have shown that the maximum interpenetration depth of the rods 20 should be between 5 and 50mm. and preferably approximately 25mm.

To vintage the grapes, each cylinder should be subjected to a vibratory movement about the pivot shaft 34 of its corresponding support arms 30. This vibratory or shaking movement makes it possible to detach the grapes of the various bunches of grapes when they have reached the desired degree of maturity. By modifying the frequency and amplitude of the oscillations of the various gathering cylinders, one clearly acts on the gathering itself, making it more or less complete. It is also indispensable to be able to modify the type of vibratory movement of the cylinders 16, 18 depending on the various vine plants.

The vibratory movement of each gathering cylinder is ensured by a device comprising two masses 38 mounted eccentrically on each of the cylinders as shown in FIG. 1. The masses 38 are fixed to a sleeve 40 keyed to a shaft 42 which is in turn mounted to rotate freely on the two rings 24 and 26 of each cylinder. According to a preferred embodiment of the invention, the masses 38 are outside the cage of each cylinder constituted by the rings 24 and 26 and by the rod supports 28. Access to them is thus particularly easy and it is quite possible to modify their weight in order to act on the type of vibratory movement imparted to the cylinders. For a gathering cylinder having a weight of between 70 and 75kg, tests have shown that it was particularly satisfactory to use two masses 38 each having a weight of approximately 5.4kg. This is thus translated by ratio of the weight of one of the masses to the total weight of one cylinder, which must be between approximately 0.07 and 0.08. The two masses 38 of each cylinder are driven at synchronous rotary speeds in order to create an imbalance giving rise to the vibratory movement of the cylinder about the pivot shaft of the support arms 30 of the cylinders. According to a preferred embodiment of the invention, the type of vibratory movement is identical for each of the two cylinders belonging to a front or rear pair. On the contrary, the nature of this vibratory movement may be different when passing from the front cylinder to the rear cylinder. This is to facilitate catching-up of the gathering of the grapes by the rear cylinders. The drive unit (pinions, chains) for rotating the sleeves 40 supporting the masses 38 is illustrated diagrammatically in FIG. 1.

FIG. 2 is a plan view of the arrangement of gathering cylinders. This figure makes it possible to consider the fact that the rods 20 provided on each cylinder are grouped along the generatrices of the cylinders in the form of vertical rows and to consider the relative arrangement of the various gathering cylinders. During the rotation of the cylinders, the free ends of the rods 20 of a front cylinder may lightly touch the free ends of the rods of a rear cylinder located on the same side of the machine as said front cylinder. In this FIG. 2, the interpenetration of the rods 20 of two cylinders belonging to one pair does not exist. As afore-mentioned, this interpenetration is variable depending on the resilient retaining force exerted on the support arms 30. Clearly, this interpenetration does not exist during the passage of the machine along a particularly wide and dense row of vine plants.

Figure 3C:
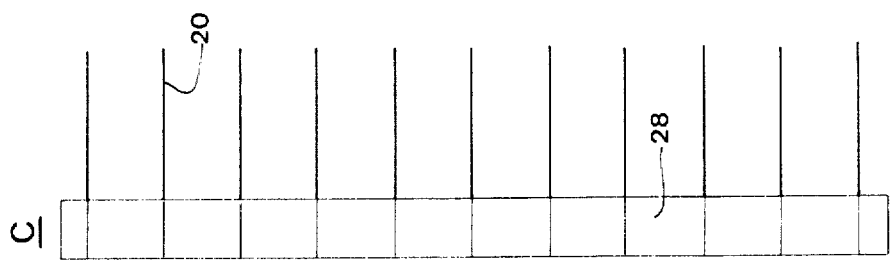
FIG. 3c is a side view of a vertical row of rods, inserted in their support, having a second open distribution.
Figure 3A:
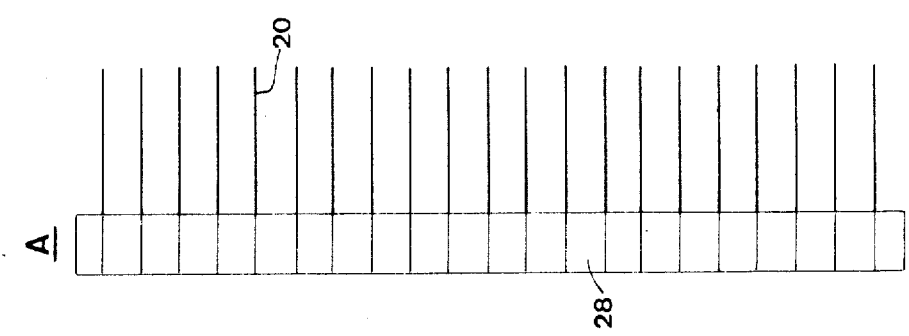
FIG. 3a is a side view of a vertical row of rods inserted in their support, having a dense distribution.
Figure 3B:
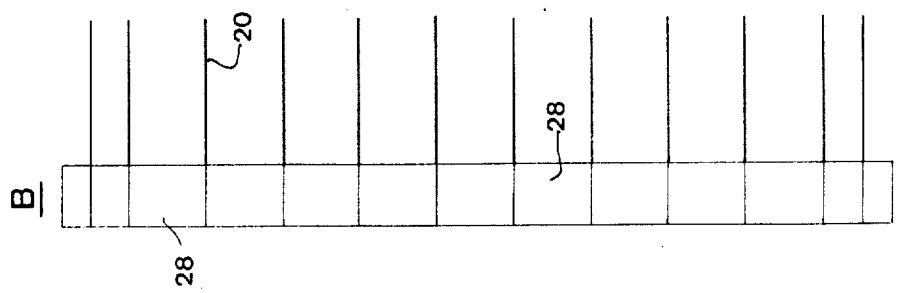
FIG. 3b is a side view of a vertical row of rods inserted in their support having a first open distribution.

One of the essential features of the present invention resides in the distribution of the rods 20 on the various gathering cylinders. In fact it is this distribution which is responsible for the quality of vintaging work of the machine. Each cylinder comprises vertical rows of rods having a dense distribution (FIG. 3a), which are each enclosed between two vertical rows of rods having an open distribution (FIG. 3b or 3c). As can be seen from all these three figures, the gap existing between two consecutive rods of a row having an open distribution is substantially equal to twice the gap existing between two consecutive rods of a row having a dense distribution. When the gathering cylinder is subject to the vibratory movement, it is appropriate to distinguish between the operation of the rows having an open distribution and the rows having a dense distribution. The rows of rods having an open distribution (FIGS. 3b and 3c) ensure a penetration of the depth of the vine and to some extent facilitate preliminary gathering of the grapes. The rows of rods having a dense distribution (FIG. 3a) ensure complete raking of the bunches which thus makes it possible to complete the picking-off of grapes.

According to another feature of the invention, the rods of the vertical rows having an open distribution provided on the front cylinders, are offset with respect to the rods of the vertical rows having an open distribution provided on the rear cylinders. Tests have shown that it was particularly advantageous that this stagger was equal to the gap existing between two consecutive rods of a vertical row having a dense distribution.

A preferred arrangement has been shown diagrammatically in FIG. 2. If one of the cylinders has vertical rows according to a first open distribution B (FIG. 3b) the two other directly adjacent cylinders, namely the second cylinder completing the front or rear pair and the other cylinder located either in front of or behind the latter, are provided with open vertical rows having a second open distribution C (FIG. 3c). Various tests have shown that it is this particular arrangement shown diagrammatically in FIG. 2 which makes it possible to obtain the best results.

The gap existing between two consecutive rods of the same vertical row having a dense distribution A (shown diagrammatically in FIG. 3a) must be between 10 and 100mm. Tests carried out with a gap of 32.5mm. have proved particularly satisfactory. Consequently, the gap existing between two consecutive rods of the same vertical row having an open distribution should be between 20 and 200mm. and preferably approximately equal to 65mm. In FIG. 3b, it should be noted that the upper and lower ends of this row having an open distribution B have been completed by two additional rods which are indispensable for ensuring complete vintaging including the lower and upper part of the vine plants.

On the basis of the various tests carried out, it was possible to draw the following conclusions:

The rods, preferably made from a high class steel (XC 65), should have a length of between 100 and 300mm. and preferably equal to approximately 150mm;

the rods must have a diameter of between 1.5 and 10mm. and be preferably equal to approximately 3.5mm.

Naturally, to retain a satisfactory vibratory movement, when increasing the length of the rods, it is indispensable to increase the diameter thereof.

It is obvious that the present invention is not limited to the particular embodiment described. In fact, it is quite possible to imagine other variations of this machine without in any way diverging from the framework of the invention. Thus, it may be advantageous to provide a system for controlling the two cylinders belonging to the same front or rear pair, such that the latter rotate exactly at the same speed during the forwards movement of the machine. In the case where the rods of the cylinders belonging to the same pair interpenetrate for example, this prevents damage both to the rods belonging to the same vertical row having a dense distribution A and to the vine itself.

What is claimed is:

1. A machine for vintaging grapes comprising:
   a frame adapted to be moved along at least one row of grapevines,
   two pairs of cylinders carried by said frame and arranged one pair behind the other with respect to the direction of movement of said frame, the axis of each cylinder being vertical, and the cylinders of each pair being arranged so that one cylinder of each pair is on each side of the row of grapevines when said frame is moved along the row,
   support means carried by said frame and supporting said cylinders for free rotation about their axes, said support means permitting movement of the cylinders of each pair toward and away from each other,
   a plurality of substantially vertical rows of resilient rods projecting radially from each of said cylinders, the rods of each row being equidistantly spaced apart for the major portion of the length of each row, and rows of relatively closely spaced apart rods alternating with rows of relatively widely spaced apart rods around the periphery of each cylinder, and means for vibrating said cylinders.

2. A machine according to claim 1 wherein the rods in the rows of relatively widely spaced apart rods of each cylinder are vertically offset from the rods in the rows of relatively widely spaced apart rods of each of the two cylinders adjacent to it.

3. A machine according to claim 1 wherein the spacing between each two consecutive rods in each row of relatively widely spaced apart rods is equal to about twice the spacing between each two consecutive rods in each row of relatively closely spaced apart rods.

4. A machine according to claim 1 wherein the spacing between each two consecutive rods in each row of relatively closely spaced apart rods is between 10 and 100mm.

5. A machine according to claim 1 wherein the spacing between each two consecutive rods of relatively closely spaced apart rods is about 32.5mm.

6. Machine according to claim 1, wherein each cylinder is mounted on two support arms which are pivotally mounted on the frame of the machine, the upper and lower pivot points being in alignment.

7. Machine according to claim 6 wherein the means for imparting vibratory movement to the cylinders comprises two masses mounted eccentrically on each cylinder outside the latter, the two masses being driven at synchronous rotary speeds to create an imbalance giving rise to the vibratory movement of said cylinder about the pivot axis of the support arms.

8. Machine according to claim 7, wherein the ratio of the weight of one of the two masses to the total weight of the cylinder is between 0.07 and 0.08.

9. Machine according to claim 6 wherein the support arms pivotally mounted on the machine frame are each subject to a resilient retaining means tending to return it towards the center of the machine.

10. Machine according to claim 9, wherein there is an interpenetration of the rods belonging to the two cylinders of the same pair under the action of the resilient retaining means of the support arms, the maximum interpenetration depth being controlled by the presence of an abutment which is integral with the machine frame, which abutment limits the travel of the support arms.

11. Machine according to claim 10, wherein the maximum interpenetration depth is between 5 and 50mm.

12. Machine according to claim 11, wherein the interpenetration depth is approximately 25mm.

13. Machine according to claim 12, wherein the rods have a length of between 100 and 300mm.

14. A machine according to claim 13, wherein the rods have a length of approximately 150mm.

15. Machine according to claim 1, wherein the rods have a diameter of between 1.5 and 10mm.

16. Machine as claimed in claim 15, wherein the rods have a diameter of approximately 3.5mm.

17. Machine according to claim 1, wherein a means is provided for controlling the two cylinders of the same pair in order that they rotate exactly at the same speed during the forward movement of the machine.

* * * * *